United States Patent [19]

Toyooka et al.

[11] 4,415,509
[45] Nov. 15, 1983

[54] ACRYLIC LAMINATED DIFFUSER PANEL HAVING HIGH LIGHT-DIFFUSING PROPERTY AND PROCESS FOR PREPARING SAME

[75] Inventors: Yasuo Toyooka, Tokyo; Kunio Ohnishi, Toyama; Kozo Ida, Toyama; Toyokazu Ego, Toyama, all of Japan

[73] Assignee: Mitsubishi Rayon Company, Ltd., Tokyo, Japan

[21] Appl. No.: 281,111

[22] Filed: Jul. 7, 1981

[51] Int. Cl.$^3$ .............................................. B29D 7/14
[52] U.S. Cl. .................................... 264/1.3; 264/1.6; 264/1.9; 264/2.5; 264/171; 264/236; 264/331.18; 264/347; 428/338
[58] Field of Search ................. 264/166, 171, 1.4, 1.3, 264/1.6, 2.5, 22, 236, 216, 347, 331.18; 428/338

[56] References Cited

U.S. PATENT DOCUMENTS

| | | | |
|---|---|---|---|
| 3,306,956 | 2/1967 | Barnette | 264/2.5 |
| 3,356,523 | 12/1967 | Libbert | 264/1.6 |
| 3,577,508 | 5/1971 | Desaulniers | 264/216 |
| 3,600,490 | 8/1971 | Billingsley et al. | 264/216 |
| 3,978,178 | 8/1976 | Oshima et al. | 264/166 |
| 4,041,120 | 8/1977 | Oshima et al. | 264/216 |
| 4,052,525 | 10/1977 | Ide et al. | 428/412 |
| 4,076,384 | 2/1978 | Deml et al. | 264/2.5 |
| 4,199,421 | 4/1980 | Kamada et al. | 264/22 |
| 4,254,074 | 3/1981 | Toyooka et al. | 264/236 |

FOREIGN PATENT DOCUMENTS

| | | |
|---|---|---|
| 40-537 | 1/1965 | Japan . |
| 44-21110 | 9/1969 | Japan . |
| 47-13371 | 4/1972 | Japan . |
| 48-8248 | 3/1973 | Japan . |
| 49-23292 | 3/1974 | Japan . |
| 49-46159 | 12/1974 | Japan . |
| 51-129449 | 11/1976 | Japan . |
| 52-56120 | 5/1977 | Japan . |
| 52-20857 | 6/1977 | Japan . |
| 52-26901 | 7/1977 | Japan . |
| 53-58554 | 5/1978 | Japan . |

*Primary Examiner*—Jeffery R. Thurlow
*Attorney, Agent, or Firm*—Cushman, Darby & Cushman

[57] ABSTRACT

An acrylic laminated diffuser panel having a high light-diffusing property is provided, which comprises a laminate of an acrylic resin film having a high light-diffusing property and an acrylic resin plate, wherein the acrylic resin film is integrated with the acrylic resin plate. The acrylic laminated diffuser panel is prepared by laminating the acrylic resin film on the molding surface of at least one of a pair of casting mold parts, casting an acrylic monomer or its partially polymerized product into a space between said pair of casting mold parts, and then, polymerizing the acrylic monomer or the partially polymerized product.

15 Claims, 10 Drawing Figures

ACRYLIC LAMINATED DIFFUSER PANEL HAVING HIGH LIGHT-DIFFUSING PROPERTY AND PROCESS FOR PREPARING SAME

BACKGROUND OF THE INVENTION (1) Field of the Invention

The present invention relates to an acrylic laminated diffuser panel comprising an integrated laminate including at least an acrylic resin film having a high-light-diffusing property and an acrylic resin plate and a process for the preparation of this acrylic laminated diffuser panel.

More particularly, the present invention relates to an acrylic laminated light diffuser panel comprising a laminate in which an acrylic resin film having a light-diffusing agent-containing layer formed thereon or an acrylic resin film containing a light-diffusing agent therein is laminated on an acrylic resin plate preferentially on one surface thereof, wherein said acrylic resin film is integrated with said acrylic resin plate by polymerization of a starting monomer of said acrylic resin plate or its partially polymerized product in the state where said acrylic resin film is partially dissolved and/or swollen by said monomer or said partially polymerized product or an acrylic polymerizable binder. The present invention also relates to a process for the preparation of this acrylic laminated light diffuser panel.

(2) Description of the Prior Art

An acrylic resin plate having, coated thereon, a layer containing an appropriate light-diffusing agent has heretofore been used as a rear projection screen, for example, in the field of a day-light screen (a screen on which a projected image can be viewed even in a bright place).

Recently, a rear projection screen is ordinarily prepared by coating a composition comprising a light-diffusing agent such as glass powder, titanium oxide, silicon oxide or calcium carbonate, a coloring agent, a binder and a diluent on one surface of a commercially available acrylic resin plate, styrene type resin plate or polycarbonate plate by spray coating, rotary coating, roll coating or flow coating, and drying and solidifying the coated composition, as disclosed in Japanese Patent Publications No. 20,857/77 and 8,248/73.

As the characteristic properties that such rear projection screens should possess, there can be mentioned total luminous transmittance, gain, reflectance, haze, diffusion rate, bending angle, contrast and resolving power. When a certain light-diffusing agent is used, these characteristics are influenced by the thickness uniformity of the light-diffusing layer, though the degree differs to some extent among these characteristics. Accordingly, in the conventional processes for the production of rear projection screens, great efforts and attention have been paid to uniformalization of the thickness of the light-diffusing layer, with the result that the coating operation becomes complicated and troublesome and requires a high degree of skill and much labor. Furthermore, the size of a substrate that can be coated, for example, an acrylic resin plate, is limited. Moreover, at the step of drying and curing a coated layer containing a light-diffusing layer, the treatment should be carried out very carefully for each plate, and also this treatment requires a large place and much labor. Furthermore, since the light-diffusing agent-containing layer is exposed to the outside, care should be taken to remove dust and to prevent the of adhesion of dust. As means for obviating these disadvantages, there is known a method in which two transparent plastic sheets are applied to both the surfaces of the light-diffusing agent-containing layer, respectively, as proposed in Japanese Utility Model Publications No. 537/65 and 21,110/69. However, in this method, it is very difficult to apply such transparent plastic sheets without incurring optical defects, and the strength of the resulting laminated structure is insufficient.

SUMMARY OF THE INVENTION

It is a primary object of the present invention to provide acrylic laminated light diffuser panels which have no disadvantages similar to those involved in the conventional techniques and which exhibit a good resolving power and can be produced at a high efficiency.

In accordance with one aspect of the present invention, there is provided an acrylic laminated diffuser panel having a high light-diffusing property, which comprises a laminate of an acrylic resin film having a high light-diffusing property and an acrylic resin plate, wherein said acrylic resin film is integrated with said acrylic resin plate.

In accordance with another aspect of the present invention, there is provided a process for the preparation of acrylic laminated difuser panels having a high light-diffusing property, which comprises laminating an acrylic resin film having a high light-diffusing property on the molding surface of at least one of a pair of casting mold parts which constitute a casting mold, casting an acrylic monomer or a partially polymerized product thereof into a space between said pair of casting mold parts, and then, polymerizing said acrylic monomer or said partially polymerized product, whereby the acrylic resin film is integrated and laminated with the resulting acrylic resin plate. In the step of polymerizing the acrylic monomer or the partially polymerized product thereof, the acrylic resin film is maintained in the state of being partially dissolved and/or swollen by its contact with the monomer or the partially polymerized product or an acrylic polymeric binder, and consequently, the resulting panel has the integrated structure.

BRIEF DESCRIPTION OF THE DRAWINGS

The acrylic laminated diffuser panel having a high light-diffusing property according to the first aspect of the present invention and the process for preparing the same according to the second aspect of the present invention will now be described in detail with reference to the accompanying drawings, wherein.

DESCRIPTION OF THE PREFERRED EMBODIMENTS

Figure 1A:
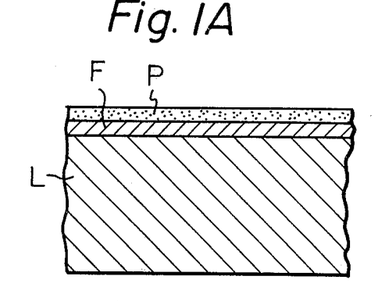
FIGS. 1A through 1D and 2A and 2B are sectional views illustrating acrylic laminated light diffuser panels of the present invention.
Figure 1B:
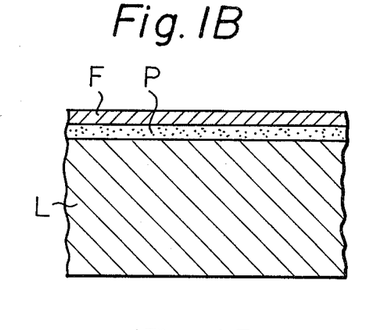
Figure 1C:
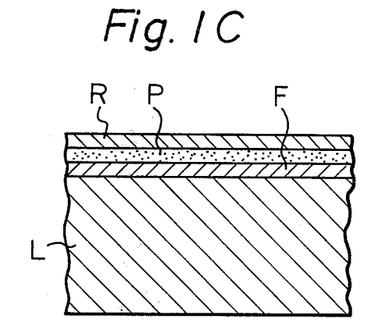
Figure 1D:
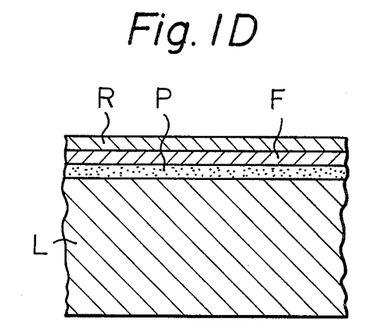
Figure 2A:
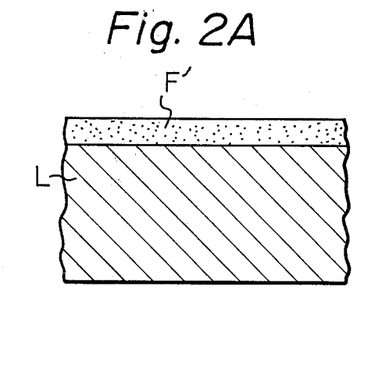
Figure 2B:
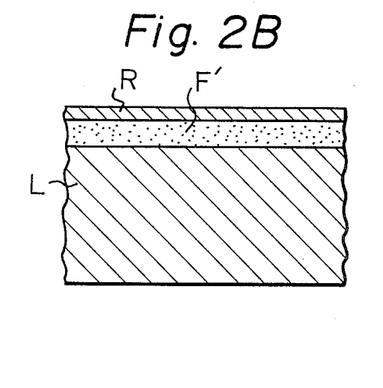

FIG. 1A illustrates an acrylic laminated diffuser panel in which a light-diffusing agent-containing layer P is formed on the molding surface of a casting mold at the step of forming an acrylic resin plate L and this layer P and an acrylic resin film F are integrated with the acrylic resin plate L. FIG. 1B illustrates an acrylic laminated light diffuser panel in which an acrylic resin film F having a light-diffusing agent-containing layer P formed thereon is integrated with an acrylic resin plate L so that the layer P is located on the inner side. FIG. 1C illustrates an embodiment in which an acrylic resin film F having a light-diffusing agent-containing layer P formed thereon and a thin layer R having the same composition as that of an acrylic resin plate L, which is formed on said layer P, are integrated with the acrylic resin plate L. FIG. 1D illustrates another embodiment which has a laminate structure similar to that of the embodiment shown in FIG. 1C, except that the lamination order of the acrylic resin film F and the light-diffusing agent-containing layer P is reversed. FIG. 2A illustrates still another embodiment in which a light-diffusing agent-containing acrylic resin film F' is integrated with an acrylic resin plate L. FIG. 2B illustrates a modification of the embodiment shown in FIG. 2A, in which a thin layer R having the same composition as that of the acrylic resin plate L is formed on the surface of the acrylic resin film F'.

As the acrylic resin plate L that is used in the present invention, there can be mentioned a resin plate composed of a homopolymer of methyl methacrylate, which may be either colorless or appropriately colored, and a plate composed of a copolymer comprising at least 90% by weight of methyl methacrylate and other copolymerizable, monoethylenically unsaturated compound and/or polyfunctional compound, which may also be either colorless or appropriately colored. As the monoethylenically unsaturated compound, there can be mentioned, for example, methacrylic acid esters (other than methyl methacrylate), acrylic acid esters and styrene, and as the polyfunctional compound, there can be mentioned, for example, methacrylic acid esters such as glycol dimethacrylate and diallyl methacrylate, diallyl phthalate, diethylene glycol bisallyl carbonate, and mixtures thereof.

The acrylic resin film F is formed of a polymer comprising as the main component an alkyl methacrylate such as methyl methacrylate, ethyl methacrylate, butyl methacrylate or propyl methacrylate (inclusive of a multi-layer polymer). For example, there may preferably be used films of alkyl methacrylate multi-layer structure polymers such as disclosed in Japanese Patent Publication No. 46,159/74, Japanese Laid-Open Patent Application No. 129,449/76, Japanese Laid-Open Patent Application No. 56,120/77, U.S. Pat. No. 4,052,525 and Japanese Patent Publication No. 13,371/72. Furthermore, there can be used films of alkyl methacrylate copolymers disclosed, for example, in Japanese Patent Publication No. 26,901/77.

The foregoing multi-layer polymers are independently formed into films, but these polymers are occasionally mixed with alkyl methacrylate polymers disclosed in Japanese Laid-Open Patent Application No. 23,292/74 or No. 58,554/78 and then formed into films. These films formed from mixed polymers can also be used in the present invention.

The acrylic resin film F that can be used in the present invention is not limited to those exemplified above, but any films which comprise an alkyl methacrylate as the main component can be used in the present invention. Furthermore, an acrylic resin film F having a thin layer R having the same composition as that of the acrylic resin plate L, which is formed on the surface of the acrylic resin film as shown in FIG. 1C, 1D or 2B, can be used in the present invention.

In the present invention, the above-mentioned acrylic resin film is used in the state where a high light-diffusing effect is attained. For this purpose, there are adopted a method in which a layer containing a light-diffusing agent is formed on at least one surface of the acrylic resin film as shown in FIGS. 1A through 1D, and a method in which an acrylic resin film containing a light-diffusing agent is used as the acrylic resin film F', as shown in FIGS. 2A and 2B.

The former method forming a light-diffusing agent-containing layer P is first described. This light-diffusing agent-containing layer P comprises a light diffusing agent, an acrylic polymerizable binder and additives to be added according to need. As the light-diffusing agent, there may be used any substances having a refractive index different from (ordinarily larger than) those of the acrylic resin plate L, acrylic resin thin layer R and the acrylic resin film F. For example, there can be mentioned silicon oxide, silicates such as calcium silicate, titanium oxide, magnesium oxide, talc, dolomite and mixtures thereof. The particle size of the light-diffusing agent is ordinarily 1 to 100 microns and preferably 1 to 20 microns.

As the acrylic polymeric binder, there can be mentioned a viscous liquid comprised of a colorless or appropriately colored monomer mixture comprising methyl methacrylate and a comonomer selected from other copolymerizable, monoethylenically unsaturated compounds and polyfunctional compounds or comprised of a partially polymerized product thereof. It is preferred that the viscosity of the viscous liquid be lower than 1,000 cps. As the monoethylenically unsaturated compounds, there can be mentioned methacrylic acid esters (other than methyl methacrylate), acrylic acid esters and styrene. As the polyfunctional compound, there can be mentioned, for example, methacrylic acid esters such as glycol dimethacrylate and diallyl methacrylate, diallyl phthalate, diethylene glycol bisallyl carbonate and mixtures thereof.

The light-diffusing agent may be incorporated into the above-mentioned binder and is used in the state suspended therein, and conventional additives may be added to the suspension according to need. One of the additives is a suspension stabilizer (precipitation-preventing agent), and commercially available surface active agents are ordinarily used as the suspension stabilizer. A non-ionic surface active agent is especially preferred. Another additive is a polymerization initiator which causes polymerization under heating. A so-called low-temperature activation type catalyst, which initiates polymerization at a relatively low temperature, such as 2,2'-azobis-(2,4-dimethylvaleronitrile) or 2,2'-azobis-(4-methoxy-2,4-dimethylvaleronitrile), is preferably used. A photopolymerization initiator is occasionally adopted as the polymerization initiator. Still another additive is a so-called plasticizer. For example, dioctyl phthalate is added as a viscosity adjuster for the suspension. Furthermore, dioctyl sulfosuccinate is occasionally added as a releasing agent.

The light-diffusing agent-containing layer P is formed by a method in which the acrylic polymerizable binder containing the light-diffusing agent is directly coated or printed on the acrylic resin film. There may also be adopted a method in which this acrylic polymerizable binder is coated on the molding surface of a casting mold and then, the acrylic resin film is laminated and integrated therewith.

In the present invention, a thin layer having the same composition as that of the acrylic resin plate L may be formed on the laminate to protect the light-diffusing agent-containing layer P. This thin layer R is prepared from a mixture of methyl methacrylate with a comonomer selected from other copolymerizable, monoethylenically unsaturated compounds and polyfunctional compounds or a partially polymerized product thereof, which has a viscosity lower than 1,000 cps, preferably in the range of from 10 to 500 cps.

The method using a light-diffusing agent-containing acrylic resin film F' will now be described. According to this method, a light-diffusing agent is incorporated into a polymer as mentioned above with respect to the acrylic resin film F and the resulting composition is formed into a film. Light-diffusing agents such as described above may be used, and the particle size of the light-diffusing agent may be the same as described above.

The amount of the light-diffusing agent incorporated into the acrylic resin film F' may be varied depending upon the particular light-diffusion agent and the particle size thereof, the polymer composition of the acrylic resin film, the thickness of the acrylic resin film and the presence or absence of a coloring agent in the acrylic resin plate. Ordinarily, however, in the present invention, it is preferred that the light-diffusing agent is incorporated in such an amount that the parallel ray percent transmission of the acrylic resin panel of the present invention is not higher than 60%. If the parallel ray percent transmission is higher than 60%, the light-diffusing effect is low.

The acrylic resin film F' may include a thin layer R having the same composition as that of the acrylic resin plate L, which is bonded closely and integrally with the acrylic resin film F'.

The preparation process according to the present invention will now be described. The process of the present invention includes, in principle, an embodiment, as shown in FIGS. 3 to 5, in which a casting mold consisting of a pair of endless belts running in parallel is used, and an embodiment, as shown in FIG. 6, in which a plurality of casting molds are used which are arranged in series and continuously move at predetermined intervals.

The former embodiment using a pair of endless belts will first be described. Referring to FIG. 3, a pair of endless belts 1 and 1' are disposed so that the confronting surfaces of the belts 1 and 1' are moved at the same speed in the same direction, and continuous gaskets 7 and 7' are arranged so that they are travelled in the state where they are gripped between both the belt surfaces in the vicinity of both the right and left side end portions of the belts. A starting monomer for the acrylic synthetic resin plate L or its partially polymerized product is continuously supplied into a space defined by these belts and gaskets from one end thereof, and the monomer or the partially polymerized product is heated to polymerize with travel of the endless belts 1 and 1' and is then cooled and separated from the endless belts 1 and 1' on the other end of the above-mentioned space, whereby the resulting acrylic resin plate is continuously recovered.

The preparation of acrylic laminated light diffuser panels of the present invention, as shown in FIGS. 1A, 1C, 1D and 2B, will now be described with reference to FIGS. 3 and 4. A viscous liquid or a partially polymerized product of methyl methacrylate, which contains a light-diffusing agent suspended therein, is charged and stored in a hold tank 171 of a coating device 17, and the amount of the viscous liquid or the partially polymerized product to be coated can be adjusted by the nitrogen pressure or liquid pressure imposed on the hold tank 171 and/or the number of gauzes 172 and/or the rotation (throttle) angle of a rotor 173. Thus, an appropriate amount of the viscous liquid or the partially polymerized product of methyl methacrylate, which has the light-diffusing agent suspended therein, is coated on the upper endless belt 1.

Figure 3:
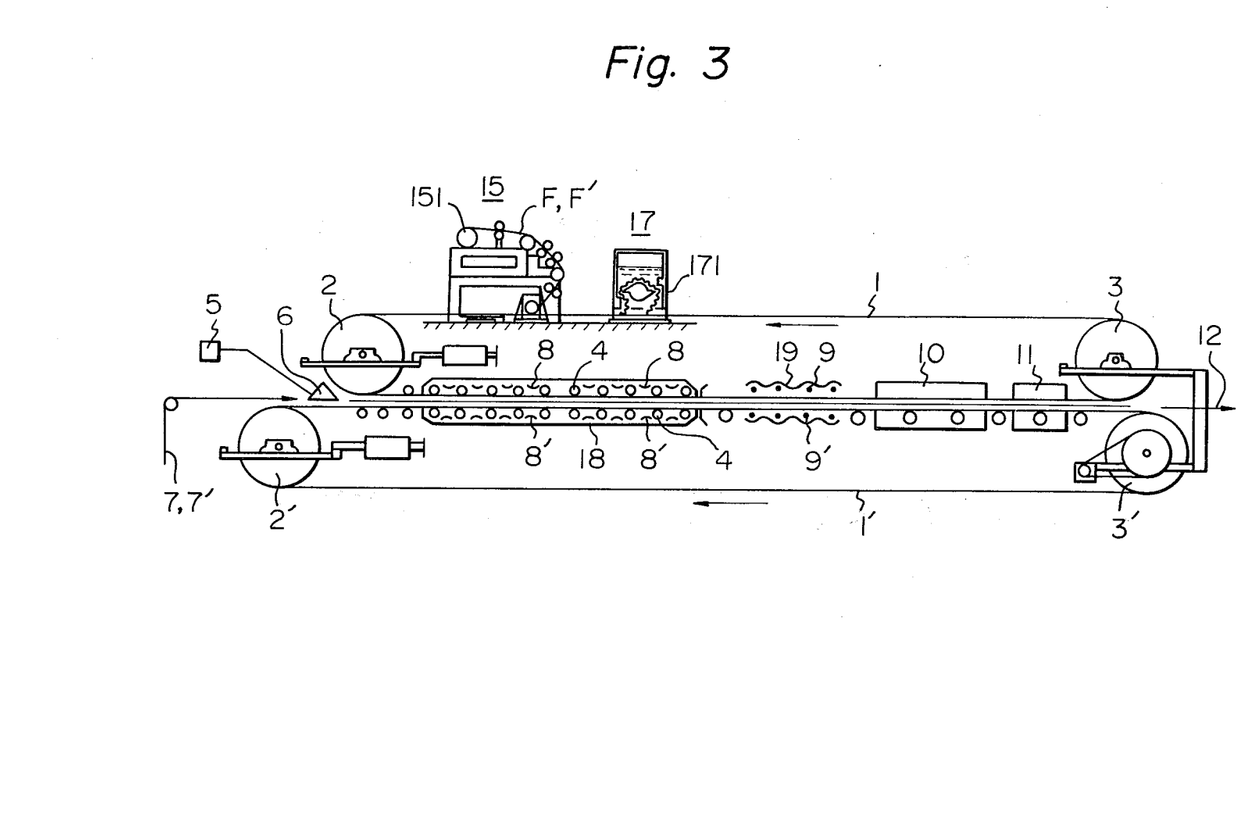
FIG. 3 is a front view illustrating the apparatus for use in carrying out one embodiment of the preparation process of the present invention.
Figure 4:
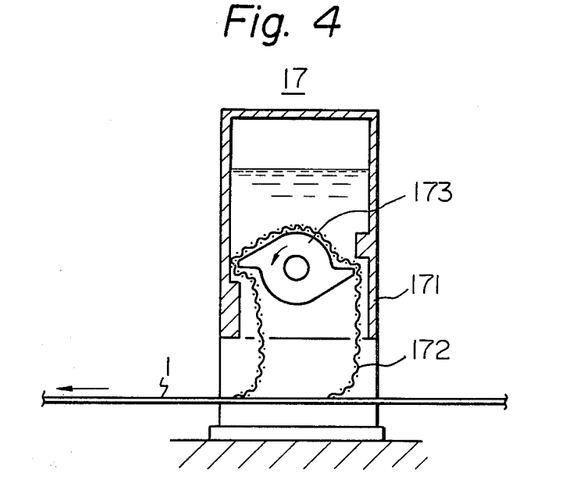
FIG. 4 is a front view showing the longitudinal section of the coating device.
Figure 5:
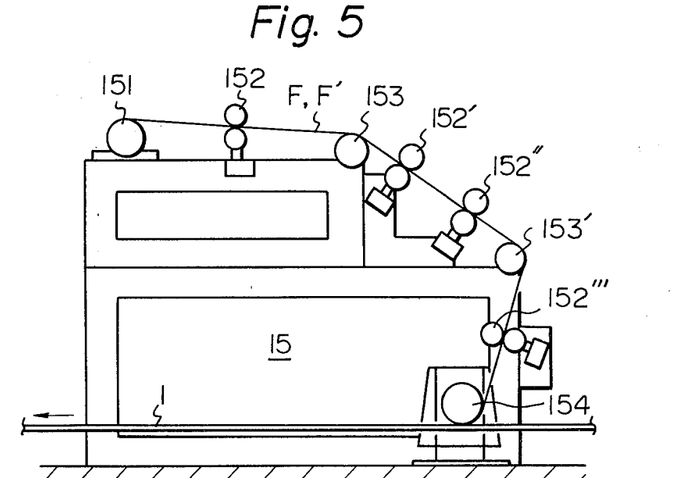
FIG. 5 is a front view showing the film supply device.
Figure 6:
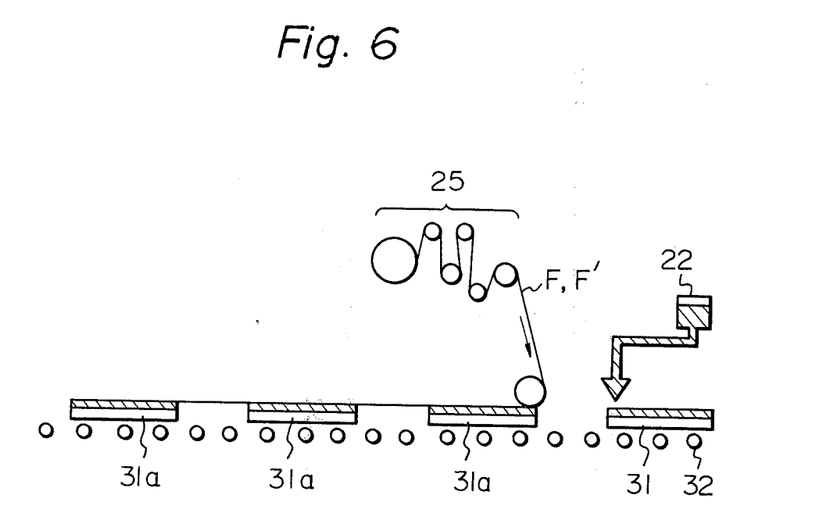
FIG. 6 is a partial front view illustrating the longitudinal section of the apparatus for use in carrying out another embodiment of the preparation process of the present invention.

As shown in FIG. 3, an acrylic resin film supply device 15 is disposed downstream of the coating device 17, and as shown in FIG. 5, an acrylic resin film F or an acrylic resin film F having a light-diffusing agent-containing layer P formed on one surface thereof is continuously supplied at a speed synchronous with the running speed of the upper endless belt 1 through a feed roller 151, pinch roller 152, 152', 152" and 152''' and guide rollers 153 and 153', and the film F is joined to the upper endless belt 1 by a press roller 154.

The starting monomer of the acrylic synthetic resin plate L or its partially polymerized product is cast into a space defined by the confronting surfaces of the upper endless belt 1 having the acrylic resin film F joined thereto and the lower endless belt 1' and the gaskets 7 and 7' from an injector 6 through a gear pump 5.

The cast starting monomer of the acrylic synthetic resin plate L or its partially polymerized product is introduced into a first polymerization zone 18 together with the acrylic resin film F joined to the upper endless belt 1 with travel of the endless belts 1 and 1', and the starting monomer or the partially polymerized product is heated to polymerize by spraying warm water maintained at 50° to 95° C. to the back surfaces of the endless belts 1 and 1' by spray devices 8 and 8'. Then, the resulting polymer is introduced into a second polymerization zone 19 and heat-treated at 115° to 150° C. by far-infrared ray heaters 9 and 9'.

The resulting plate-like polymer sandwiched between the upper and lower endless belts 1 and 1' is passed through a first cooling zone 10 and a second cooling zone 11 and cooled below 105° C., preferably to 80° to 100° C., and the plate-like polymer is separated and withdrawn from the other end portion of the running endless belts 1 and 1'. Incidentally, it is preferred that the travelling speed of the endless belts be adjusted to 0.5 to 4.0 m/min.

When an acrylic laminated light diffuser panel as shown in Fig. 1B is prepared, the coating device 17 is dismounted from the preparation system and an acrylic resin film F having a light-diffusing agent-containing layer P formed on one surface thereof is supplied from the film supply device 15, and other operations are carried out in the same manner as described above.

An acrylic laminated diffuser panel as shown in FIG. 2A may be prepared by dismounting the coating device 17 and supplying a film F' containing a light-diffusing agent therein from the film supply device 15 in the above-mentioned manner. An acrylic laminated diffuser panel as shown in FIG. 2B can be prepared by using the apparatus shown in FIG. 3 without any modification and supplying the acrylic resin film F' from the film supply device 15.

The embodiment using a plurality of casting molds which are arranged in series and continuously move at predetermined intervals will now be described with reference to FIG. 6.

The casting molds used in the present embodiment may be made of a reinforced glass or a metal such as stainless steel, aluminum or brass, which may have a mirror-polished surface or may have fine convexties or concavities on the surface thereof according to the intended object. Furthermore, a Fresnel lens pattern or lenticular lens pattern may be formed on the molding surfaces of these molds. Two or more kinds of these molds may be used in combination. In the present invention, these various molds may be collectively called "casting molds".

As shown in FIG. 6, casting molds 31, each consisting of a single plate, are continuously moved at predetermined intervals along a linear passage by a conveyor 32 such as a roll or belt, and an acrylic resin film F having a light-diffusing agent-containing layer P formed thereon or an acrylic resin film F' containing a light-diffusing agent therein is supplied onto the molding surfaces of the molds at the same speed as the travelling speed of the molds. At this step, a monomer or partially polymerized product having the same composition as that of the starting monomer of the acrylic resin plate or its partially polymerized product is supplied from a starting material tank 22 and thinly coated on the molding surfaces of the molds 31, and the acrylic resin film F or F' is adhered to the coated surface of each mold 31 fed at the same speed. The mold 31a having the acrylic resin film F or F' adhered thereto is subjected to a cutting treatment for removing the portions of the film F or F' protruding from both side edges of the mold 31a by cutting, and the so-treated molds 31a are combined and assembled into a casting mold cell according to customary procedures. The peripheral portion of the casting mold cell is sealed by gaskets, and a starting monomer of the acrylic synthetic resin plate or the partially polymerized product thereof is cast into the cell, heated at 45° to 95° C. at the first polymerization stage and then heat-treated at 100° to 150° C. at the second polymerization stage. While the cast monomer or partially polymerized product is being polymerized, the acrylic resin film F or F' supplied in the above-mentioned manner is dissolved and/or swollen by the monomer or the partially polymerized product. When the molded plate is separated from the mold after completion of the polymerization, there is obtained an acrylic laminated panel comprising an acrylic resin plate and an acrylic resin film having a high light-diffusing property, closely laminated and integrated with the acrylic resin plate. The acrylic resin film that is used in this embodiment may be either an acrylic resin film having a light-diffusing agent-containing layer P formed in advance thereon or an acrylic resin film containing a light-diffusing agent therein. When an acrylic resin film F free of a light-diffusing agent is used, an acrylic polymerizable binder is prepared by adding a light-diffusing agent to the above-mentioned monomer or partially polymerized product, and this acrylic polymerizable binder is coated and then the acrylic resin film F is supplied onto the coating.

Incidentally, it is preferred that the thickness of the acrylic resin plate L prepared according to the above-mentioned process of the present invention be in the range of from 0.5 to 15 mm.

As will be apparent from the foregoing description, in the acrylic laminated light diffuser panel of the present invention, since an acrylic resin film having a light-diffusing agent-containing layer laminated thereon or an acrylic resin film containing a light-diffusing agent therein is integrally laminated with an acrylic resin plate, the thickness of the layer exerting a light-diffusing effect can be reduced to an extreme extent and the resolving power can therefore be increased. Furthermore, since this light-diffusing layer can be isolated from the outside, the light-diffusing layer can effectively be protected from being scratched or marred or can be prevented from being peeled off when dust is removed by cleaning or washing of the surface of the panel. Moreover, such acrylic laminated diffuser panel can be prepared at a high efficiency according to the process of the present invention.

The acrylic laminated light diffuser panel of the present invention can directly be used as a screen such as a rear projection screen or it may be combined with a Fresnel lens or lenticular lens prepared separately and be used as a screen.

The present invention will now be described in detail with reference to the following Examples.

EXAMPLE 1

Preparation of an acrylic resin film having a light-diffusing agent-containing layer P formed in advance thereon by coating, is illustrated in this Example.

Various known industrial methods may be adopted for forming a light-diffusing agent-containing layer P on one surface of an acrylic resin film F. For example, there may be adopted a method in which an acrylic resin film F is continuously supplied onto a belt or the like moving at a constant speed, a viscous liquid formed of a suspension of a light-diffusing agent is coated on one surface of the acrylic resin film F by a flow coater or roll coater (at this step, the acrylic resin film is partially swollen and/or dissolved and consequently closely integrated with the light-diffusing agent-containing layer), the coating is dried and cured, and the resulting acrylic resin film including the light-diffusing agent-containing layer P is peeled off from the belt.

When it is desired to further uniformalize the thickness of the light-diffusing agent-containing layer P, the above-mentioned method is modified so that the viscous liquid formed of the suspension of the light-diffusing agent is coated on the surface of the belt, the acrylic resin film F is supplied onto the coating and the acrylic resin film is pressed by a press roll (at this step, the acrylic resin film F is partially swollen and/or dissolved and consequently integrated closely with the light-diffusing agent-containing layer) to thereby uniformalize the thickness of the light-diffusing layer P. After drying and curing, the resulting acrylic resin film including the light-diffusing agent-containing layer is peeled off from the belt.

EXAMPLE 2

Preparation of acrylic laminated diffuser panels as shown in FIGS. 1A, 1C and 1D is illustrated in this Example.

A partially polymerized product of methyl methacrylate containing about 30% by weight of polymethyl methacrylate and having a viscosity of about 1,000 cps as measured at 25° C. is prepared by pre-polymerizing monomeric methyl methacrylate. Then, 650 ppm of azobisdimethylvaleronitrile as a polymerization catalyst, 30 ppm of dioctyl sulfosuccinate as a releasing agent, 80 ppm of carbon black and 10 ppm of Cyanine Blue are added to the partially polymerized product. As shown in FIG. 3, the resulting mixture is continuously supplied between surfaces of a pair of endless belts 1 and 1' at a constant rate from an injector 6 by means of a gear pump 5. Each of the endless belts 1 and 1' is a polished stainless steel endless belt having a thickness of 1.5 mm and a width of 1,500 mm. The endless belts 1 and 1' are stretched between upper pulleys 2 and 3 and lower pulleys 2' and 3', respectively, and the tension on the endless belts 1 and 1' is set at 10 kg/mm$^2$ by a hydraulic pressure. The pulleys 2 and 2' have a diameter of 1,600 mm. The endless belts 1 and 1' are travelled at a speed of 2.5 m/min.

When it is desired to prepare an acrylic laminated diffuser panel as shown in FIG. 1A, a viscous liquid formed by adding a light-diffusing agent to an acrylic polymerizable binder is charged in a hold tank 171 of a coating device 17 and is coated on the upper endless belt 1.

The light-diffusing agent-containing viscous liquid is prepared by adding 0.3% by weight of propylene glycol monostearate as a suspension stabilizer, 500 ppm of azobisdimethylvaleronitrile as a polymerization initiator and 100 ppm of dioctyl sulfosuccinate as a releasing agent to a mixture comprising 55 parts by weight of prepolymer of methyl methacrylate containing 20% by weight of polymethyl methacrylate and having a viscosity of 50 cps as measured at 25° C. and 45 parts by weight of silicon oxide having an average particle size of 5 microns. The resulting viscous liquid has a viscosity of 1,500 cps as measured at 25° C.

When an acrylic laminated diffuser panel as shown in FIG. 1C or 1D is prepared, a partially polymerized product of methyl methacrylate to be charged in the hold tank 171 of the coating device 17 has a polymethyl methacrylate content of 23% by weight and contains 500 ppm of azobisdimethylvaleronitrile as a polymerization initiator and 100 ppm of dioxtyl sulfosuccinate as a releasing agent. It has a viscosity of 80 cps as measured at 25° C.

The above-mentioned viscous liquid (in case of the diffuser panel shown in FIG. 1A) or the partially polymerized product of methyl methacrylate (in case of the diffuser panel shown in FIG. 1C or 1D) is stored in the hold tank 171 of the coating device 17 as shown in FIG. 4. The amount of the viscous liquid or partially polymerized methyl methacrylate to be fed is adjusted according to the travelling speed of the endless belts 1 and 1' and the desired coating thickness, by controlling the nitrogen pressure or liquid pressure in the tank and/or the number of gauze 172 and/or the rotation (throttle) angle of a rotor 173.

The acrylic resin film supply device 15 is operated according to the following procedures.

When it is desired to prepare an acrylic laminated diffuser panel as shown in FIG. 1A, for example, an acrylic resin film F having a thickness of 50 microns and comprising 64% by weight of methyl methacrylate and 36% by weight of butyl acrylate is continuously supplied onto the upper endless belt 1 from the film supply device 15. When it is desired to prepare the acrylic laminated diffuser panel shown in FIG. 1C or 1D, an acrylic resin film F having the same composition and thickness as mentioned above and including a light-diffusing agent-containing layer P formed on one surface thereof according to the method described in Example 1 is continuously supplied onto the upper endless belt 1 from the film supply device 15 in such a manner that the light-diffusing agent-containing layer P is not brought into contact with the surface of the upper endless belt 1.

The film supply device 15 used for supply of the above-mentioned acrylic resin film F is illustrated in FIG. 5. Referring to FIG. 5, the acrylic resin film F is supplied through pinch rollers 152, 152', 152" and 152'" and guide rollers 153 and 153' from a feed roller 151, and while the acrylic resin film F is being pressed by a press roller 154 to the coating of the light-diffusing agent-containing viscous liquid or the thin layer R of the partially polymerized methyl methacrylate which has been applied upstream, the acrylic resin film F is travelled together with the upper endless belt 1.

The acrylic resin film F is partially swollen and/or dissolved by the monomeric methyl methacrylate contained in the coating of the viscous liquid of the acrylic polymerizable binder or the thin layer R of the partially polymerized methyl methacrylate downstream of the press roller 154, but since the temperature of the upper endless belt 1 is high (40° to 60° C.), polymerization occurs in the monomer before the acrylic resin film reaches the position of the pulley 2, and the acrylic resin film is integrated with the coating or the thin layer R.

The acrylic resin film F is thus integrated with the coating or the thin layer R and is guided to the position of the opening of the injector 6 while being carried by the upper endless belt 1, and it is combined with the partially polymerized methyl methacrylate supplied from the opening of the injector 6 and is delivered while being sandwiched between the confronting two endless belts 1 and 1'.

The clearance between the two endless belts 1 and 1' is held by rollers 4 and 4' arranged at intervals of 400 mm so that the methyl methacrylate polymer plate of the acrylic laminated diffuser panel has a uniform thickness of, for example, 2 mm (the plate thickness can optionally be changed within the range of from 0.5 to 15 mm). Hollow pipes having an outer diameter of 13.0 mm and a thickness of 0.8 mm, which are formed of 100 parts by weight of polyvinyl chloride and 44 parts by weight of dibutyl phthalate as a plasticizer, are used as gaskets 7 and 7'.

The partially polymerized methyl methacrylate supplied into a space defined by the surface of the acrylic resin film F travelled with the upper endless belt 1, the surface of the lower endless belt 1' and the gaskets 7 and 7' is guided to a first polymerization zone 18 having a length of 66 mm, and while the partially polymerized methyl methacrylate is passed through this first polymerization zone 18, warm water maintained at 84° C. is sprayed on the back surfaces of both the endless belts 1 and 1' by spray devices 8 and 8', whereby the methyl methacrylate prepolymer is heated to substantially polymerize to form a plate-like polymer.

The acrylic resin film F is partially swollen and/or dissolved by the monomeric methyl methacrylate contained in the partially polymerized product supplied from one end portion of the paired endless belts 1 and 1' in case of FIGS. 1A and 1C while it is being travelled to the first polymerization zone 18, but the swollen and/or dissolved acrylic resin film F is polymerized and cured together with the partially polymerized methyl methacrylate in the first polymerization zone 18, and the acrylic resin film F is integrated with the resulting plate-like polymer.

The plate-like methyl methacrylate polymer integrated with the acrylic resin film F in the first polymerization zone 18 is delivered to a second polymerization zone 19 having a length of 24 mm with travel of the paired endless belts 1 and 1'. While the plate-like polymer is travelled through the second polymerization zone 19, the temperature of the endless belts 1 and 1' kept in contact with the plate-like polymer is elevated to 140° C. by far infrared ray heaters 9 and 9'. The temperature of the plate-like polymer is 127° C. at the outlet of the second polymerization zone 19.

The plate-polymer delivered from the second polymerization zone 19 is advanced to a first cooling zone 10 having a length of 5.4 m with travel of the endless belts 1 and 1'. In the first cooling zone 10, air is blown vertically to the back surfaces of the endless belts 1 and 1' by using a blower, and the plate-like polymer is cooled to 103° C. at a cooling rate of 14.4° C./min. Then, the plate-like polymer is guided into a second cooling zone 11 having a length of 3 m, where the plate-like polymer is cooled to 80° C. by air. Then, the plate-like polymer is separated from the endless belts 1 and 1' and withdrawn as a product panel.

The withdrawn panel product comprising integrated acrylic resin film F, light-diffusing agent-containing layer P and acrylic resin plate L has a very uniform thickness of 2±0.15 mm, and no wrinkles are formed in the acrylic resin film F, and unevenness is not observed in the light-diffusing agent-containing layer P.

EXAMPLE 3

Preparation of an acrylic laminated diffuser panel as shown in FIG. 1B is illustrated in this Example.

The coating device 17 is dismounted, and an acrylic resin film F having a light-diffusing agent-containing layer P formed on one surface thereof according to the method described in Example 1 is supplied from the film supply device 15 in such a manner that the light-diffusing agent-containing layer P is not brought into contact with the upper endless belt 1. Other operation procedures are the same as described in Example 2. In this Example, since the temperature of the upper endless belt 1 is high, only by increasing the compression pressure of the press roller 154 shown in FIG. 5 for pressing the acrylic resin film to the upper endless belt 1, the intended acrylic laminated diffuser panel can be prepared without formation of an air layer between the upper endless belt 1 and the acrylic resin film F.

EXAMPLE 4

A syrup is prepared from the partially polymerized product of methyl methacrylate used in Example 2 without incorporation of carbon black and Cyanine Blue. The partially polymerized methyl methacrylate is mixed with 650 ppm of azobisdimethylvaleronitrile as a polymerization catalyst and 30 ppm of dioctyl sulfosuccinate (Aerosol OT) as a releasing agent. In the same manner as described in Example 2, the mixture is supplied between the endless belts 1 and 1' shown in FIG. 3 and travelled at a speed of 3 m/min.

A film F' of a copolymer comprising 64% by weight of methyl methacrylate and 36% by weight of butyl acrylate, which contains a light-diffusing agent and has a thickness of 50 microns is supplied onto the upper endless belt 1 from the film supply device 15.

Prior to supply of the film F', the methyl methacrylate syrup is thinly coated on the surface of the upper endless belt 1 by the coating device 17 in the same manner as described in Example 2, and supply of the film F' is carried out in the same manner as described in Example 2.

The light-diffusing agent-containing methyl methacrylate/butyl acrylate copolymer film F' is sandwiched between the running endless belts 1 and 1' together with the methyl methacrylate syrup supplied from the injector 6 and is travelled in this state.

The clearance between the upper and lower endless belts 1 and 1' is maintained by rollers 4 and 4' arranged at intervals of 400 mm so that the obtained plate-like polymer has a uniform thickness of 3 mm. The same gaskets 7 and 7' as used in Example 2 are used.

The methyl methacrylate syrup supplied in a space defined by the surface of the light-diffusing agent-containing methyl methacrylate/butyl acrylate copolymer film F' running with the upper endless belt 1, the surface of the lower endless belt 1' and the gaskets 7 and 7' is guided into the first polymerization zone 18 and polymerized in this zone 18 in the same manner as described in Example 2. In this zone, the film F' is partially swollen and/or dissolved by the monomeric methyl methacrylate contained in the methyl methacrylate syrup supplied from one end portion of the endless belts 1 and 1', and closely integrated with a plate-like polymer formed by polymerization of the methyl methacrylate syrup.

The resulting plate-like polymer is passed through the second polymerization zone 19 and then through the first and second cooling zones 10 and 11, and it is then separated from the endless belts 1 and 1' and withdrawn as a product.

The obtained plate-like methyl methacrylate polymer having the light-diffusing agent-containing methyl methacrylate/butyl acrylate copolymer film F' closely integrated therewith has a structure as shown in FIG. 2A and a thickness of 3±0.3 mm. No wrinkles are formed on the methyl methacrylate/butyl acrylate copolymer film F' including a light-diffusing layer therein, and undesirable peeling of the film from the plate-like methyl methacrylate polymer is not observed at all.

When a laminated light diffuser panel as shown in FIG. 2B is prepared, prior to supply of the film F', a methyl methacrylate syrup is thinly coated on the surface of the upper endless belt 1 by the coating device 17 in the same manner as described in Example 2, and supply of the film F' is carried out in the same manner as described in Example 2.

EXAMPLE 5

The apparatus shown in FIG. 6, which has a plurality of casting mold parts is used. A reinforced glass sheet having a thickness of 10 mm, a width of 1420 mm and a length of 1168 mm is used as a mold part 31. The interval between every two adjacent mold parts 31 is adjusted to about 150 mm, and in this state, the mold parts 31 are continuously moved at a speed of 0.5 m/min by a conveyor. A partially polymerized product of methyl methacrylate (having a degree of polymerization of 3% and a viscosity of 10 cps) is thinly coated on the casting mold part 31 by the coating device. A film of a copolymer comprising 64% by weight of methyl methacrylate and 36% by weight of butyl acrylate, which has a thickness of 100 microns and contains 8% by weight of silicic anhydride having an average particle size of 10 microns, is used as the light-diffusing agent-containing acrylic resin film F'.

The film F' is supplied onto the coated surface of the mold part 31 at the same speed as the moving speed of the mold 31 by means of feed rollers 25 and is continuously bonded to the coated surface of the mold part. Then, the portion of the film F' protruding from both side edges of the mold part 31 is removed by cutting to obtain a mold part.

The mold part is combined with a mold part of brass having a Fresnel lens pattern formed thereon, and according to customary procedures, the combined mold parts are sealed by hollow gaskets of a polyvinyl chloride resin to form a casting mold cell.

A methyl methacrylate syrup containing 500 ppm of azobisisobutyronitrile as a polymerization catalyst, 30 ppm of dioctyl sulfosuccinate as a releasing agent and 30 ppm of carbon black and 1 ppm of Cyanine Blue as coloring agents is cast into the cell. The distance between the two mold parts is adjusted so that the thickness of the resulting plate is 3 mm, and the cast syrup is heated to polymerize at 60° C. for 6 hours and at 120° C. for 2 hours. The resulting synthetic resin plate is cooled and peeled from both the mold parts, whereby an excellent acrylic laminated diffuser panel having a light-diffusing layer in the interior thereof and a Fresnel lens pattern on one surface is obtained.

We claim:

1. A process for the preparation of acrylic laminated diffuser panels having a high light-diffusing property, which process comprises the successive steps of:
   (1) laminating an acrylic resin, particle-containing film having a high light-diffusing property onto the molding surface of at least one of a pair of casting mold parts, wherein said light diffusing particles are incorporated in an amount such that the parallel ray percent transmission of the finished acrylic diffuser panel is not greater than about 60%,
   (2) casting an acrylic monomer or its partially polymerized product into a space between said pair of casting mold parts, and then,
   (3) polymerizing said acrylic monomer of said partially polymerized product, thereby causing the acrylic resin film to become integrated with and laminated onto the resulting acrylic resin plate.

2. A process for the preparation of acrylic laminated diffuser panels having a high light-diffusing property according to claim 1, wherein said pair of the casting mold parts are a pair of endless belts running in parallel.

3. A process for the preparation of acrylic laminated diffuser panels having a high light-diffusing property according to claim 1, wherein a plurality of the casting molds are used which are arranged in series and move continuously at predetermined intervals.

4. A process for the preparation of acrylic laminated diffuser panels having a high light-diffusing property according to claim 1 or 3, wherein a Fresnel lens pattern is formed on the molding surface of one mold part of the or each casting mold.

5. A process for the preparation of acrylic laminated diffuser panels having a high light-diffusing property according to claim 1 or 3, wherein a lenticular lens pattern is formed on the molding surface of one mold part of the or each casting mold.

6. A process for the preparation of acrylic laminated diffuser panels having a high light-diffusing property according to claim 1 or 3, wherein fine convexities and concavities are formed on the molding surface of at least one mold part of the or each casting mold.

7. A process for the preparation of acrylic laminated diffuser panels having a high light-diffusing property according to claim 1, wherein a viscous liquid suspension of a light-diffusing agent in an acrylic polymerizable binder is coated on the molding surface of one mold part of the or each casting mold and the acrylic resin film is supplied onto the coating.

8. A process for the preparation of acrylic laminated diffuser panels having a high light-diffusing property according to claim 1, wherein an acrylic resin film having a light-diffusing agent-containing layer formed on one surface thereof is supplied to the molding surface of one mold part of the or each casting mold.

9. A process for the preparation of acrylic laminated diffuser panels having a high light-diffusing property according to claim 1, wherein an acrylic resin film containing a light-diffusing agent is supplied to the molding surface of one mold part of the or each casting mold.

10. A process for the preparation of acrylic laminated diffuser panels having a high light-diffusing property according to any of claims 1 through 3, wherein a monomer or its partially polymerized product having the same composition as that of the acrylic resin plate to be formed is coated in advance on the molding surface of one mold part of the or each casting mold to form a thin layer and an acrylic resin film having a light-diffusing agent-containing layer formed on one surface thereof is supplied onto said thin layer.

11. A process for the preparation of acrylic laminated diffuser panels having a high light-diffusing property according to any of claims 1 through 3, wherein a monomer or its partially polymerized product having the same composition as that of the acrylic resin plate to be formed is coated in advance on the molding surface of one mold part of the or each casting mold to form a thin layer and an acrylic resin film containing a light-diffusing agent is supplied onto said thin layer.

12. A process for the preparation of acrylic laminated diffuser panels having a high light-diffusing property according to any of claims 1 through 3, wherein the acrylic resin film is made of a polymer predominantly comprised of units derived from an alkyl methacrylate selected from methyl methacrylate, ethyl methacrylate, butyl methacrylate and propyl methacrylate.

13. A process for the preparation of acrylic laminated diffuser panels having a high light-diffusing property according to any of claims 7 through 9, wherein the light-diffusing agent has a particle size of 1 to 100 microns and is at least one member selected from the group consisting of silicon oxide, calcium silicate, titanium oxide, magnesium oxide, talc and dolomite.

14. A process for the preparation of acrylic laminated diffuser panels having a high light-diffusing property, which process comprises the successive steps of:
   (1) laminating an acrylic resin film having a high light-diffusing property containing particles of the order of 1 to 100 microns therein on the molding surface of at least one of a pair of casting mold parts, wherein said particles diffuse light and are incorporated in an amount such that the parallel ray percent transmission of the finished acrylic diffuser panel is not greater than about 60%,
   (2) casting an acrylic monomer or its partially polymerized product into a space between said pair of casting mold parts, and then, (3) polymerizing said acrylic monomer or said partially polymerized product, thereby causing the acrylic resin to become integrated with and laminated onto the resulting acrylic resin plate.

15. The process for the preparation of acrylic laminated diffuser panels having a high light-diffusing property according to claim 14 wherein said particles are selected from the group consisting of silicon oxide, calcium silicate. titanium dioxide, magnesium oxide, talc, dolomite or mixtures thereof.

* * * * *